United States Patent
Ren et al.

(10) Patent No.: US 10,608,470 B2
(45) Date of Patent: Mar. 31, 2020

(54) RECEIVER FOR AN INDUCTIVE POWER TRANSFER SYSTEM AND A METHOD FOR CONTROLLING THE RECEIVER

(71) Applicant: Apple Inc., Cupertino, CA (US)

(72) Inventors: Saining Ren, Freemans Bay (NZ); Lawrence Bernardo Dela Cruz, Freemans Bay (NZ); Daniel Robertson, Freemans Bay (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/439,340

(22) PCT Filed: Oct. 29, 2013

(86) PCT No.: PCT/NZ2013/000193
§ 371 (c)(1),
(2) Date: Apr. 29, 2015

(87) PCT Pub. No.: WO2014/070025
PCT Pub. Date: May 8, 2014

(65) Prior Publication Data
US 2015/0295418 A1    Oct. 15, 2015

Related U.S. Application Data

(60) Provisional application No. 61/720,108, filed on Oct. 30, 2012.

(30) Foreign Application Priority Data

Oct. 29, 2012  (NZ) .......................................... 603287

(51) Int. Cl.
*H02J 50/00*    (2016.01)
*H02J 50/12*    (2016.01)
(Continued)

(52) U.S. Cl.
CPC .............. *H02J 50/12* (2016.02); *H02J 7/025* (2013.01); *H04B 5/0037* (2013.01)

(58) Field of Classification Search
CPC .. H02J 38/14; H02J 17/00; H02J 50/00; H02J 5/00; H02J 7/00; H02J 38/00; H02J 50/12; H04B 5/00
(Continued)

(56) References Cited

U.S. PATENT DOCUMENTS 4,833,337 A    5/1989   Kelley et al.
4,914,539 A    4/1990   Turner et al.
(Continued)

FOREIGN PATENT DOCUMENTS

CN    101023600 A    8/2007
CN    101138144      3/2008
(Continued)

OTHER PUBLICATIONS

Hunter H. Wu, Grant A. Covic, John T. Boys, Daniel J. Robertson, "A Series-Tuned Inductive-Power-Transfer Pickup With a Controllable AC-Voltage Output," Jan. 2011, IEEE Transactions on Power Electronics, vol. 26, No. 1.*
(Continued)

*Primary Examiner* — Rexford N Barnie
*Assistant Examiner* — Joseph N Inge
(74) *Attorney, Agent, or Firm* — Blank Rome LLP

(57) ABSTRACT

An inductive power transfer receiver is provided including a receiving coil (13) in series with a capacitor (14), a voltage multiplier (15) for providing a DC output, and a power control switch (18) controlled by a controller (19) for regulating the power supplied to a load. An inductive power transfer receiver is provided including a receiving coil in series with a capacitor, a charge pump for providing a DC output, and a power control switch controlled by a controller
(Continued)

for regulating the power supplied to a load. A method of power flow control in an inductive power transfer circuit having a power control switch is also provided. The method includes detecting two operational transitions in the circuit and determining a reference timing bases on which operational transition is detected earliest within a detection window. The reference timing is used to developing a signal for controlling the power control switch.

22 Claims, 11 Drawing Sheets

(51) Int. Cl.
 *H02J 7/02* (2016.01)
 *H04B 5/00* (2006.01)
(58) Field of Classification Search
 USPC .................................................. 307/104
 See application file for complete search history.

(56) References Cited

U.S. PATENT DOCUMENTS

| | | | |
|---|---|---|---|
| 4,973,907 | A | 11/1990 | Bergman et al. |
| 5,701,121 | A | 12/1997 | Murdoch |
| 5,702,431 | A | 12/1997 | Wang et al. |
| 6,081,084 | A * | 6/2000 | Crecelius ............ H02J 7/1492 318/145 |
| 6,301,128 | B1 | 10/2001 | Jang et al. |
| 6,515,878 | B1 | 2/2003 | Meins et al. |
| 7,161,331 | B2 | 1/2007 | Wai et al. |
| 7,952,322 | B2 | 5/2011 | Partovi et al. |
| 8,093,758 | B2 | 1/2012 | Hussmann et al. |
| 8,259,428 | B2 | 9/2012 | Mollema et al. |
| 8,786,314 | B2 * | 7/2014 | Maruyama ............ H02J 50/12 326/127 |
| 2004/0218406 | A1 | 11/2004 | Jang et al. |
| 2007/0029965 | A1 | 2/2007 | Hui |
| 2007/0237273 | A1 | 10/2007 | Tan et al. |
| 2008/0157743 | A1 * | 7/2008 | Martin ............... H02M 3/1584 323/284 |
| 2008/0235869 | A1 | 10/2008 | Matsuo |
| 2009/0096413 | A1 | 4/2009 | Partovi et al. |
| 2010/0171368 | A1 | 7/2010 | Schatz et al. |
| 2011/0053500 | A1 | 3/2011 | Menegoli et al. |
| 2011/0069516 | A1 * | 3/2011 | Greene ............... H02J 1/10 363/126 |
| 2011/0090723 | A1 | 4/2011 | Hu et al. |
| 2011/0105023 | A1 | 5/2011 | Scheer et al. |
| 2011/0116290 | A1 | 5/2011 | Boys et al. |
| 2011/0254377 | A1 | 10/2011 | Wildmer et al. |
| 2011/0254379 | A1 | 10/2011 | Madawala |
| 2011/0280048 | A1 | 11/2011 | Fujiyoshi et al. |
| 2012/0050931 | A1 | 3/2012 | Terry et al. |
| 2012/0170337 | A1 * | 7/2012 | Lisi ................ H02J 50/12 363/126 |
| 2012/0267960 | A1 | 10/2012 | Low et al. |
| 2012/0313444 | A1 * | 12/2012 | Boys ............... H02J 50/12 307/104 |
| 2013/0051083 | A1 * | 2/2013 | Zhao ............... H02J 50/12 363/17 |
| 2013/0249479 | A1 * | 9/2013 | Partovi ............ H02J 7/025 320/108 |
| 2014/0028108 | A1 | 1/2014 | Hsu |
| 2014/0092659 | A1 * | 4/2014 | Lin ................. H02J 50/10 363/126 |
| 2015/0207333 | A1 * | 7/2015 | Baarman ............ H02J 5/005 307/104 |
| 2015/0303824 | A1 * | 10/2015 | Celani ............... H02J 17/00 307/104 |
| 2015/0349573 | A1 * | 12/2015 | Tschirhart ............ H02J 50/12 320/108 |

FOREIGN PATENT DOCUMENTS

| | | |
|---|---|---|
| CN | 101902083 A | 12/2010 |
| CN | 103944388 A | 7/2014 |
| EP | 0609964 A2 | 8/1994 |
| EP | 1609501 A1 | 12/2005 |
| GB | 2199202 | 6/1988 |
| JP | 2000184625 | 6/2000 |
| JP | 2001238372 A | 8/2001 |
| JP | 2003-509991 | 3/2003 |
| JP | 2005168246 A | 6/2005 |
| JP | 2005525705 | 8/2005 |
| JP | 2008-104295 | 5/2008 |
| JP | 2009201211 | 9/2009 |
| JP | 2009539343 A | 11/2009 |
| JP | 2011-205882 | 10/2011 |
| JP | 2011205761 | 10/2011 |
| JP | 2012060850 A | 3/2012 |
| JP | 2012130173 A | 7/2012 |
| KR | 10-2008-0096919 | 11/2008 |
| WO | 2004105208 A1 | 12/2004 |
| WO | 2008039945 A2 | 4/2008 |
| WO | WO 2009/074207 | 6/2009 |
| WO | 2009091267 A2 | 7/2009 |
| WO | 2010030195 A1 | 3/2010 |
| WO | 2011/046453 A1 | 4/2011 |
| WO | WO 2011/04645 | 4/2011 |
| WO | 2011145953 A1 | 11/2011 |
| WO | 2012133446 A1 | 10/2012 |
| WO | 2013006068 A1 | 1/2013 |
| WO | 2013080212 A2 | 6/2013 |

OTHER PUBLICATIONS

Hunter H. Wu, Grant A. Covic, John T. Boys, Daniel J. Robertson, "A Series-Tuned Inductive-Power-Transfer Pickup With a Controllable AC-Voltage Output," Jan. 2011, IEEE Transactions on Power Electronics, vol. 26, No. 1 (Year: 2011).*
International Search Report for International Application No. PCT/NZ2013/000193 dated Nov. 8, 2014 (4 pages).
International Preliminary Report on Patentability for International Application No. PCT/NZ2013/000193 dated May 5, 2015 (9 pages).
Chinese Office Action for CN Application No. 201380056165.4 dated Jan. 22, 2017 (11 pages), translation included.
Chinese Office Action for CN Application No. 201380056165.4 dated Sep. 21, 2017 (5 pages).
Japanese Office Action for JP Application No. 2015-539546 dated Sep. 29, 2017 (4 pages).
Boonyaroonate et al., "Analysis and Design of Class E Isolated DC/DC Converter Using Class E Low dv/dt PWM Synchronous Recrifier", IEEE Transactions on Power Electronics, Institute of Electrical and Electronics Engineers, USA, vol. 16, No. 4, Jul. 1, 2002 (Jul. 1, 2001), XP011043568, ISSN: 0885-8993.
Luk et al., "State-Space Modeling of a Class Ed Converter for Inductive Links", IEEE Transactions on Power Electronics. Institute of Electrical and Electronics Engineers, USA, vol. 30, No. 6, Jun. 24, 2014 (Jun. 24, 2014), pp. 3242-3251, XP011570281, ISSN: 0885-8993, DOI: 10.1103/TPEL.2014.2332451 [retrieved on Jan. 16, 2015].
Hirota et al., "Pratical evaluations of single-ended load resonant inverter using application-specific heating appliance", Power Electronics and Drive Systems, 1995., Proceedings of the 1995 Intern Ational Conference on Singapore Feb. 21-24 1, New Your, NY, USA, IEEE, Feb. 21, 1995 (Feb. 21, 1995), pp. 531-537, XP010140703, DOI: 10.1109/PEDS.1995.404866, ISBN: 987-0-8703-2423-7.
Terai et al, "Comparative performance evaluations of IGBT's and MCT incorporated into voltage-source-type single-ended quasi-resonant zero-voltage soft switching inverter", Electrical Engineering in Japan, vol. 144, No. 3, Aug. 1, 2003 (Aug. 1, 2003), pp. 58-68, XP055504116, US ISSN: 0424-7760, DOI: 10.1002/eej. 10151.
Omori et el., A new resonant IPT-wireless EV charging system with single-ended quasi-resonant inverter for home use, 2013 IEEE 14th Workshop on Control and Modeling for Power Electronics (Com-

(56) References Cited

OTHER PUBLICATIONS pel). IEEE, Jun. 23, 2013 (Jun. 23, 2013), pp. 1-7, XP032500858, ISSN: 1093-5142, DOI: 10.1109/COMPEL.2013.6626448 [retrieved on Oct. 9, 2013].

* cited by examiner

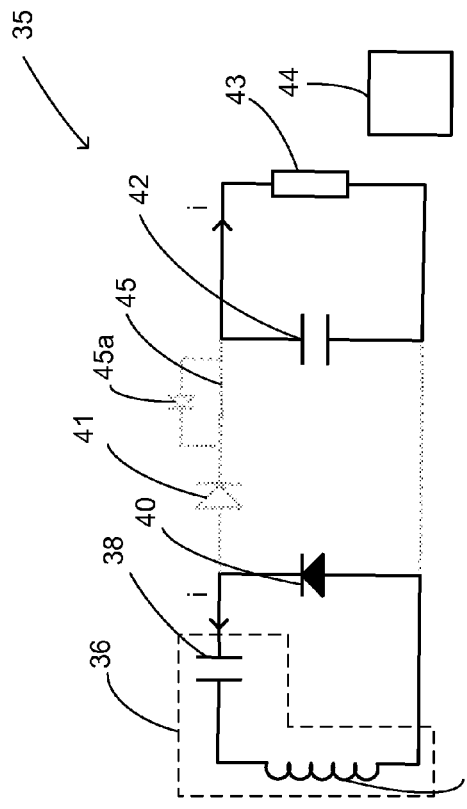
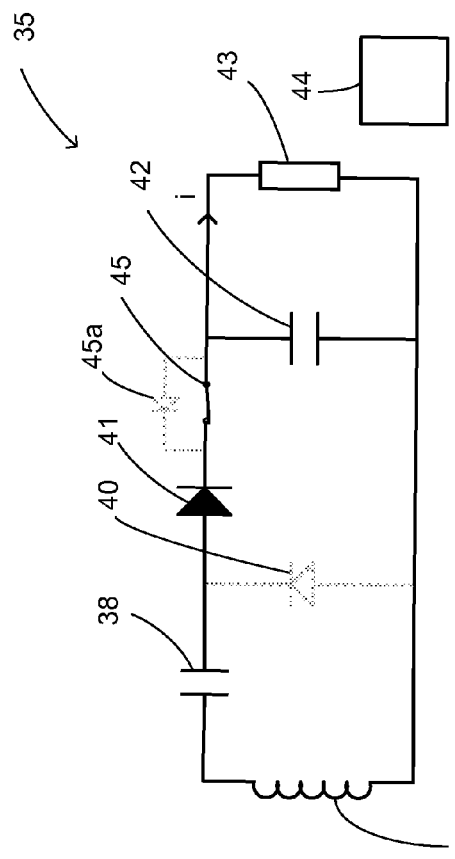
Figure 11B
Figure 11A

RECEIVER FOR AN INDUCTIVE POWER TRANSFER SYSTEM AND A METHOD FOR CONTROLLING THE RECEIVER

This application is a National Stage Application of PCT/NZ2013/000193, filed 29 Oct. 2013, which claims benefit of Serial No. 603287, filed 29 Oct. 2012 in New Zealand and Ser No. 61/720,108 filed on 30 Oct. 2012 in the United States and which applications are incorporated herein by reference. To the extent appropriate, a claim of priority is made to each of the above disclosed applications.

FIELD OF THE INVENTION

The present invention is in the field of inductive power transfer (IPT). More particularly, the invention relates to receivers for use in IPT systems, and for methods for controlling receivers and for detecting the induced current phase in receivers.

BACKGROUND OF THE INVENTION

IPT systems are a well known area of established technology (for example, wireless charging of electric toothbrushes) and developing technology (for example, wireless charging of handheld devices on a 'charging mat'). Typically, a primary side (transmitter) generates a time-varying magnetic field with a transmitting coil or coils. This magnetic field induces an alternating current in a suitable receiving coil in a secondary side (receiver). This induced current in the receiver can then be used to charge a battery, or power a device or other load. In some instances, the transmitting coils or the receiving coils may be connected with capacitors to create a resonant circuit, which can increase power throughput and efficiency at the corresponding resonant frequency.

Typically, receivers used in IPT systems consist of: a pickup circuit (e.g. a resonant circuit in the form of an inductor and capacitor); a rectifier for converting the induced power from AC to DC; and a switched-mode regulator for regulating the voltage of the power ultimately provided to a load.

A common problem with receivers used in IPT systems is that the switched-mode regulator may include a DC inductor. The DC inductor acts as an energy store so that power can be suitably regulated. Such DC inductors can be a bulky circuit component, significantly affecting the total size occupied by the receiver. This can be a particular problem in applications where it is preferable that the receiver be as small as possible (for example, handheld devices).

In some receivers that do not use a DC inductor, complex phase timing is needed to ensure that circuit components are not damaged. This makes sensing and control more complex, and more susceptible to noise and failure.

Another common problem with receivers used in IPT systems is that variations in the operating frequency of the transmitter or resonant frequency of the receiver (due to, for example, changes in load or other circuit parameters), can affect the amount and efficiency of power transfer.

For receivers, it is known to include switches in power converter stages (e.g. switched-mode regulators or synchronous rectifiers). Often, these switches are controlled so that they switch when the voltage across the switch is zero (zero-voltage switching (ZVS)) or the current through the switch is zero (zero-current switching (ZCS)). The benefits of ZVS and ZCS are well-known, including minimising losses in the switches. In order to suitably control the switches to achieve ZVS or ZCS, it is necessary to detect the phase of the voltage or current in the circuit. One known method for detecting the phase is using a current sense resistor. However the current flowing in an IPT receiver can have a large dynamic range, which can in turn lead to the current sense resistor overheating at high loads and unreliable signals at low loads. Another known method for detecting phase is using a current transformer. However such current transformers are bulky and may not be fast enough for high-frequency applications.

It is an object of the invention to provide receivers for IPT systems that minimise the size of the DC inductor.

It is a further object of the invention to provide receivers for IPT systems that do not include a DC inductor.

It is a further object of the invention to provide a method for detecting phase in a receiver that performs well for a range of loads from low to high, and a method that does not rely on bulky circuit components.

Each object is to be read disjunctively with the object of at least providing the public with a useful choice.

SUMMARY OF THE INVENTION

According to one exemplary embodiment there is provided an inductive power transfer receiver including: a resonant circuit, having a receiving coil connected in series with a capacitor; a voltage multiplier for providing a DC output to a load; a power control switch for regulating the power supplied to the load; and a controller that controls the power control switch to regulate the power supplied to the load.

According to another exemplary embodiment there is provided a method of power flow control in an inductive power transfer circuit having a power control switch for controlling power flow including the steps of: detecting a first operational transition of the circuit; detecting a second operational transition of the circuit; determining a reference timing based on which of the first or second operational transition is detected earliest within a detection window; and developing a signal for controlling the power control switch based on the reference timing.

According to a further exemplary embodiment there is provided an inductive power transfer circuit including a power control switch for controlling power flow and a including: a means for detecting a first operational transition; a means for detecting a second operational transition; a means for determining a reference timing based on which of the first or second operational transition is detected earliest within a detection window; and a means for developing a signal for controlling the power control switch based on the reference timing.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

FIGS. 11A to 11D show effective circuit diagrams corresponding to the different stages of operation of the receiver of FIG. 4 according to one embodiment.

DETAILED DESCRIPTION OF EMBODIMENTS OF THE INVENTION

Figure 1:
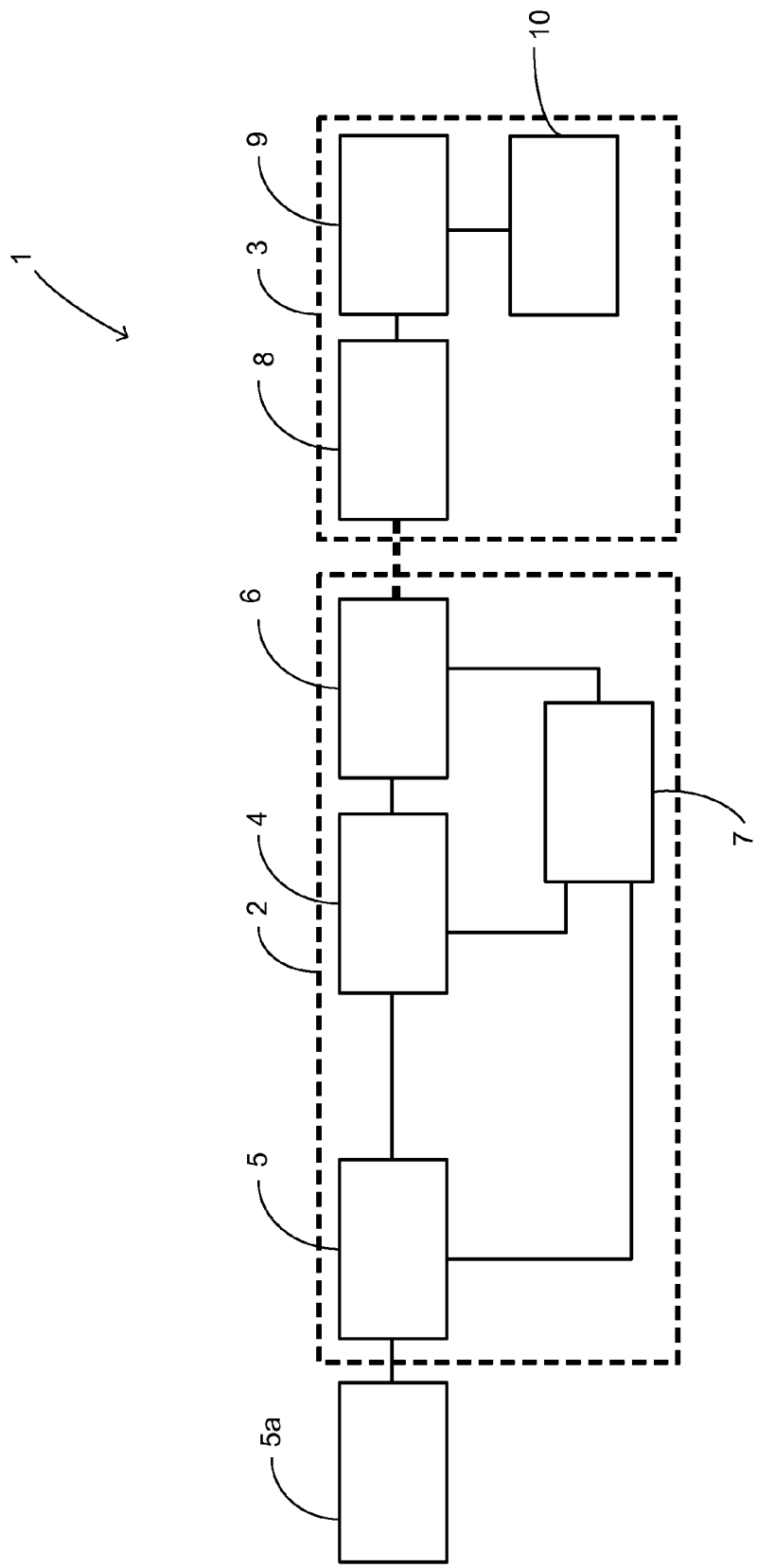
FIG. 1 shows a block diagram of an IPT system.

FIG. 1 is a block diagram showing a general representation of an inductive power transfer system 1. The IPT system includes a transmitter 2 and a receiver 3. The transmitter includes a converter 4 that is connected to an appropriate power supply. In FIG. 1 this is shown as a DC-DC converter 5 that is connected to a DC power supply 5a. The converter may be a non-resonant half bridge converter or any other converter adapted for the particular IPT system, such as a push-pull converter. The converter is configured to output an alternating current of desired frequency and amplitude. The voltage of the output of the converter may also be regulated by the converter, the DC-DC converter or combination of both.

The converter 4 is connected to transmitting coil(s) 6. The converter supplies the transmitting coil(s) with an alternating current such that the transmitting coil(s) generates a time-varying magnetic field with a suitable frequency and amplitude. In some configurations, the transmitting coil(s) may also be considered to be an integral part of the converter, but for the sake of clarity this description will refer to them as distinct.

The transmitting coil(s) 6 may be any suitable configuration of coils, depending on the characteristics of the magnetic field that are required in a particular application and the particular geometry of the transmitter. In some IPT systems, the transmitting coils may be connected to capacitors (not shown) to create a resonant circuit. Where there are multiple transmitting coils, these may be selectively energised so that only transmitting coils in proximity to suitable receiving coils are energised. In some IPT systems, it may be possible that more than one receiver may be powered simultaneously. In IPT systems, where the receivers are adapted to control the power provided to the load (as, for example, in the embodiments of the present invention described in more detail below), the multiple transmitting coils may be connected to the same converter. This has the benefit of simplifying the transmitter as it does not need to control each transmitting coil separately. Further, it may be possible to adapt the transmitter so that it regulates the power provided to the transmitting coils to a level dependent on the coupled receiver with the highest power demands.

FIG. 1 also shows a controller 7 within the transmitter 2. The controller can be connected to each part of the transmitter. The controller is adapted to receive inputs from each part of the transmitter and produce outputs that control the way each part of the transmitter operates. The controller may include a memory. The controller is preferably a programmable logic controller that is programmed to perform different computational tasks depending on the requirements of the IPT system.

FIG. 1 also shows a receiver 3. The receiver includes a receiving coil(s) 8 that is suitably connected to receiver circuitry 9 that in turn supplies power to the load 10. The load may be a battery. The receiver circuitry is adapted to convert the induced current into a form that is appropriate for the load. In some IPT systems, the receiving coils) may be connected to capacitors (not shown) to create a resonant circuit.

Embodiments of the present invention relate to receivers for use in IPT systems, and for methods for detecting the phase in the receiver, which will be described in more detail below. Though these will be described with respect to certain embodiments, those skilled in the art will appreciate that changes in circuit design or method of operation may be made without departing from the general idea of the invention.

Figure 2:
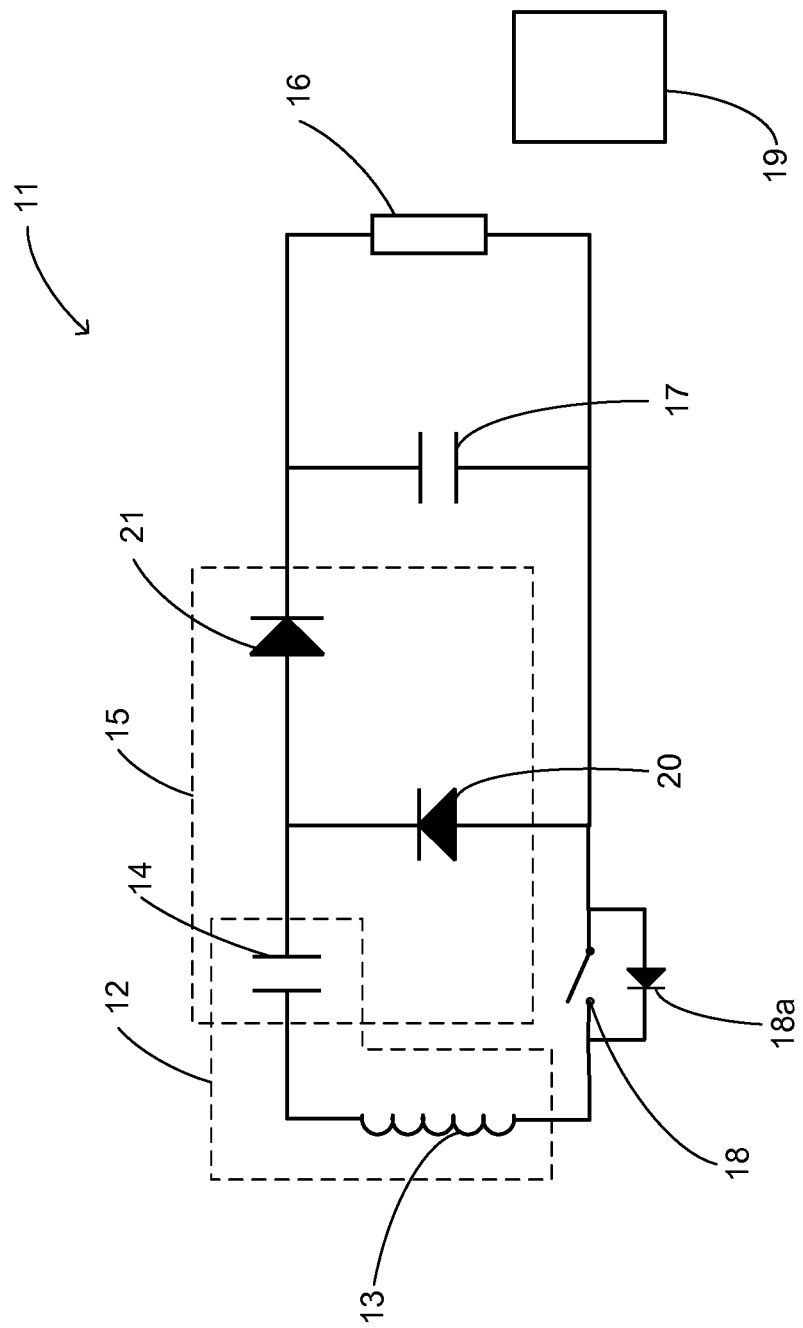
FIGS. 2 to 6 show circuit diagrams for receiver topologies according to different embodiments of the present invention.

Referring to FIG. 2, there is shown an inductive power transfer receiver 11 for use in an IPT system according to one embodiment of the present invention. The receiver includes a resonant circuit 12, having a receiving coil 13 (shown as an inductor) and a resonant capacitor 14. The receiver also includes a voltage multiplier circuit 15. The voltage multiplier circuit, which will be described in more detail below, provides a DC output to a load 16. The load may be any suitable DC load, such as the battery charging circuit of a portable device. The load is connected to a DC smoothing capacitor 17.

The receiver includes a power control switch 18, which will be described in more detail below, that regulates the power of the DC output. The receiver also includes a controller 19.

Referring to the resonant circuit 12 of the receiver 11 in FIG. 2, the receiving coil 13 and resonant capacitor 14 are connected in series (i.e. the resonant circuit is 'series-resonant'). The resonant circuit is adapted to receive power from a time-varying magnetic field generated by a suitable transmitter. The resonant circuit may be adapted to be resonant at the operating frequency of the IPT system. In some IPT systems, the receiver may be adapted to be 'mis-tuned' to the transmitter frequency, so that active tuning in the receiver can bring the system into tune. Those skilled in the art will appreciate that the values of the receiving coil and resonant capacitor will affect the resonant frequency of the receiver, and that the receiving coil and resonant capacitor may be selected so as to resonate at the operating frequency of a transmitter or any other suitable frequency. Other considerations may also influence the type and size of the receiving coil and resonant capacitor used in the receiver, for example the dimensions of the receiver or device in which the receiver is used, or the required power. The resonant circuit will produce an AC output.

The voltage multiplier circuit 15 of the receiver 11 of FIG. 2 includes the resonant capacitor 14 from the resonant circuit 12 and two asymmetric current flow devices 20 21 connected in a half-bridge configuration. The half-bridge configuration is such that the voltage multiplier circuit has a shared AC and DC ground. For the sake of clarity, the rest of this description will refer to the asymmetric flow device that is generally in parallel with the resonant circuit as 'first' 20 and will refer to the asymmetric flow device that is generally in series with the load as 'second' 21. In FIG. 2, the asymmetric current flow devices are diodes. Those skilled in the art will appreciate that the position and orientation of the diodes is such that the AC input into the voltage multiplier circuit is rectified to produce a DC output. Those skilled in the art will appreciate that other asymmetric current flow devices may be used instead of the diodes, and the invention is not limited in this respect. In one embodiment, controlled switches may be used. In another embodiment, a combination of any suitable asymmetric current flow devices (such as diodes or controlled switches) may be used in the voltage multiplier circuit. Controlled switches may provide improved performance over diodes but they must be controlled so that they are switched off when they need to prevent the flow of current. Possible controlled switches that may be used include any suitable transistors such as MOSFETs, IGBTs or BJTs.

The power control switch 18 of the receiver 11 of FIG. 2 regulates the power provided to the load 16. In this embodiment of the invention, the power control switch is shown in series with the resonant circuit 12; however as will be discussed in more detail below, the power control switch may also be positioned in other locations in the receiver. The power control switch may be a transistor such as a MOSFET, IGBT or BJT. The power control switch may include a body diode 18*a*.

The power control switch 18 is controlled by the controller 19. The controller is adapted to receive inputs from parts of the receiver, which can include the current and voltage being supplied to the load 16. The controller may also be provided with the load's power requirements by inputs or any other suitable means. The controller will control the power control switch so as to regulate the power provided to the load. The power control switch may be controlled in switch mode. The controller may include a memory. The controller is preferably a programmable logic controller that is programmed to perform different computational tasks, including controlling the power control switch.

Those skilled in the art will appreciate that there are many methods of controlling the power control switch 18 which will result in the regulation of the power provided to the load 16, and example embodiments will be described in more detail later.

Figure 3:
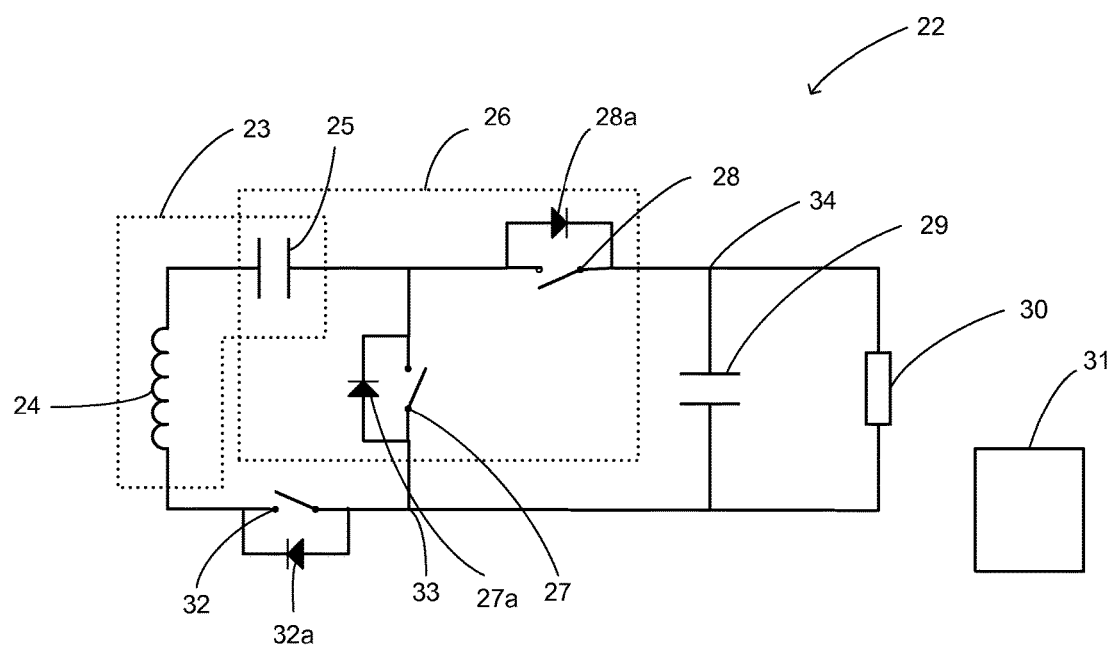

Referring to FIG. 3, there is shown another embodiment of a receiver 22 according to the present invention. The receiver includes a resonant circuit 23, having a receiving coil 24 (shown as an inductor) and a resonant capacitor 25. The receiver also includes a voltage multiplier circuit 26, which provides a DC output to a load 30. The load is connected to a DC smoothing capacitor 29. The receiver includes a power control switch 32 that may have a body diode 32*a*. The receiver also includes a controller 31. This receiver is similar to the receiver 11 of FIG. 2, however the asymmetric current flow devices used in the voltage multiplier circuit are controlled switches 27 28. The controlled switches may have body diodes 27*a* 28*a*. This embodiment of the invention provides the added benefit that all three switches (i.e. the power control switch 32 and the two controlled switches 27 28) can all be driven without the need for floating driving. In particular, the power control switch 32 and the first controlled switch 27 can be driven with reference to a common ground 33. The second controlled switch 28 can be driven with reference to a fixed voltage high side voltage 34.

Figure 4:
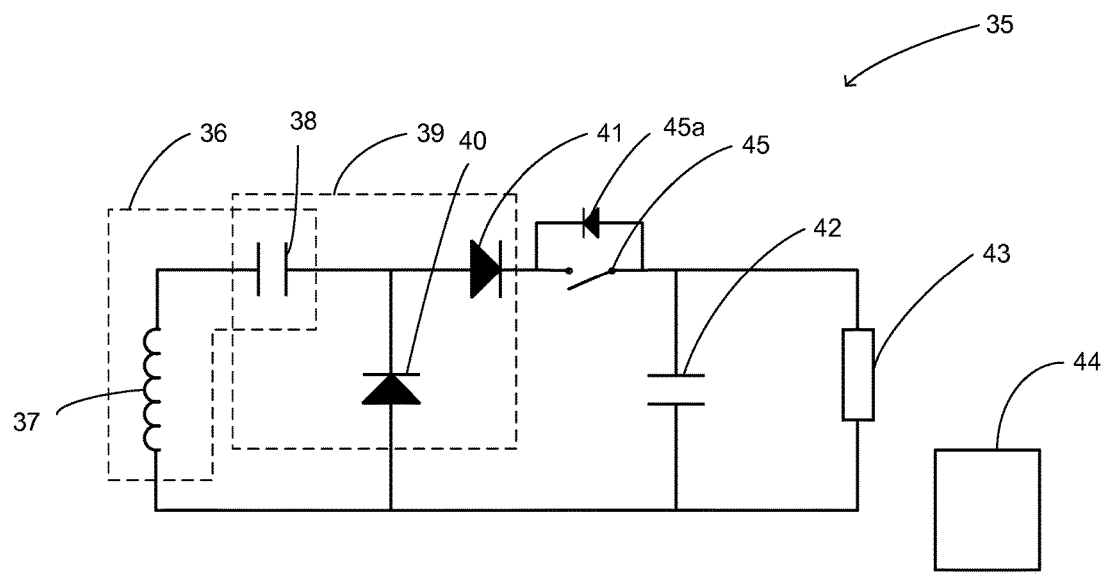

Referring to FIG. 4, there is shown an inductive power transfer receiver 35 for use in an IPT system according to another embodiment of the present invention. The receiver includes a resonant circuit 36, having a receiving coil 37 (shown as an inductor) and a resonant capacitor 38. The receiver also includes a voltage multiplier circuit 39 having two asymmetric current flow devices 40 41, which provides a DC output to a load 43. The load is connected to a DC smoothing capacitor 42. The receiver includes a power control switch 45 that may have a body diode 45*a*. The receiver also includes a controller 44. This receiver is similar to the receiver 11 of FIG. 2, however in this embodiment of the invention the power control switch 45 is located in series with the second asymmetric flow control device 41 in the voltage multiplier circuit.

Figure 5:
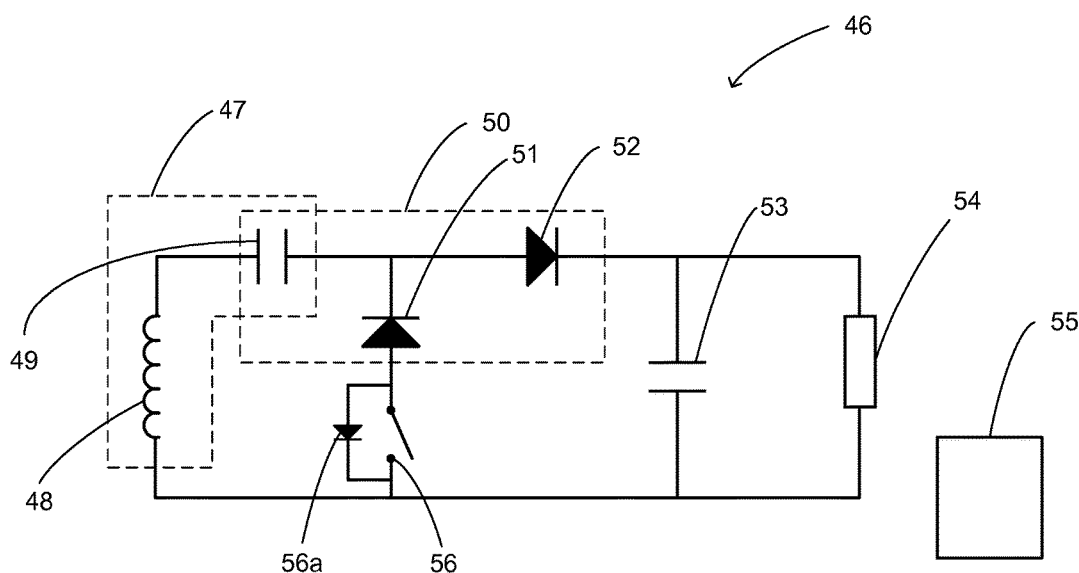

Referring to FIG. 5, there is shown an inductive power transfer receiver 46 for use in an IPT system according to another embodiment of the present invention. The receiver includes a resonant circuit 47, having a receiving coil 48 (shown as an inductor) and a resonant capacitor 49. The receiver also includes a voltage multiplier circuit 50 having two asymmetric current flow devices 51 52, which provides a DC output to a load 54. The load is connected to a DC smoothing capacitor 53. The receiver includes a power control switch 56 that may have a body diode 56*a*. The receiver also includes a controller 55. This receiver is similar to the receiver 11 of FIG. 2, however, in this embodiment of the invention the power control switch 56 is located in series with the first asymmetric power flow device 51 in the voltage multiplier circuit 50.

Figure 6:
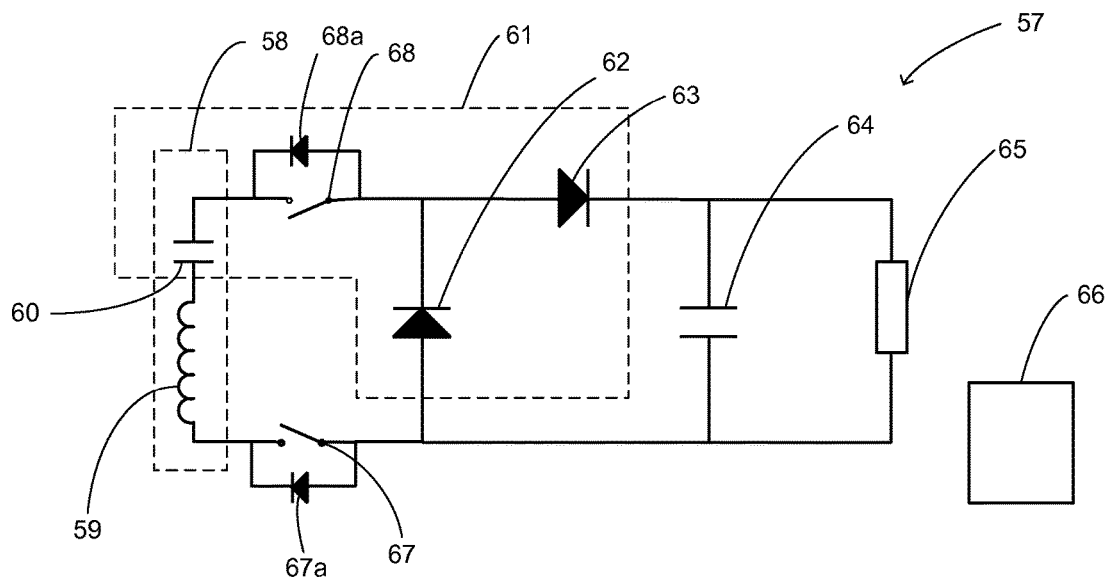

In another aspect of the invention, the receiver may include more than one power control switch. Referring to FIG. 6, there is shown an inductive power transfer receiver 57 for use in an IPT system according to another embodiment of the present invention. The receiver includes a resonant circuit 58, having a receiving coil 59 (shown as an inductor) and a resonant capacitor 60. The receiver also includes a voltage multiplier circuit 61 having two asymmetric current flow devices 62 63, which provides a DC output to a load 65. The load is connected to a DC smoothing capacitor 64. The receiver includes a power control switch 67 that may have a body diode 67*a*. The receiver also includes a controller 66. This receiver is similar to the receiver 11 of FIG. 2 in that it also includes a power control switch 67 in series with the power receiver coil 59; however in this embodiment of the invention there is a further power control switch 68 in series with the power receiver coil. This further power control switch may include a body diode 68*a*. A further power control switch may improve the Q value for the receiver by allowing both the positive and negative half cycles of current to be controlled to produce a symmetrical current through the power receiver coil.

Those skilled in the art will appreciate how the topologies discussed in reference to FIGS. 2-6 show the power control switch(es) in different positions but that it may be possible to position the power control switch in other positions without departing from the invention. Having the power control switch included in the resonant circuit or voltage multiplier circuit parts of the receiver can remove the requirement for additional power converter stages in the receiver. In particular, there is no further voltage regulation stage and no bulky DC inductor. It will also be appreciated how the control of the power control switch(es) can be adapted depending on the position of the power control circuit(es) in the receiver. Those skilled in the art will appreciate that there are many suitable methods for controlling the power control switch(es) which will result in the regulation of the power provided to the load.

Further, those skilled in the art will appreciate that the voltage multiplier circuit, as shown in FIGS. 2-6 described above, is suitable in many situations where the output DC voltage provided to the load needs to be have the same or higher voltage than the input. However, those skilled in the art will appreciate that it may be possible to modify the receivers shown in FIGS. 2-6 so that a DC output is provided to the load that has a lower voltage. In such an embodiment, the 'voltage multiplier' circuit described above becomes a 'charge pump' circuit which encompasses rectifiers that increase (i.e. voltage multipliers) or decrease output voltage with respect to the input voltage, where the resonant circuit and power control switch are part of the charge pump circuit.

Figure 7:
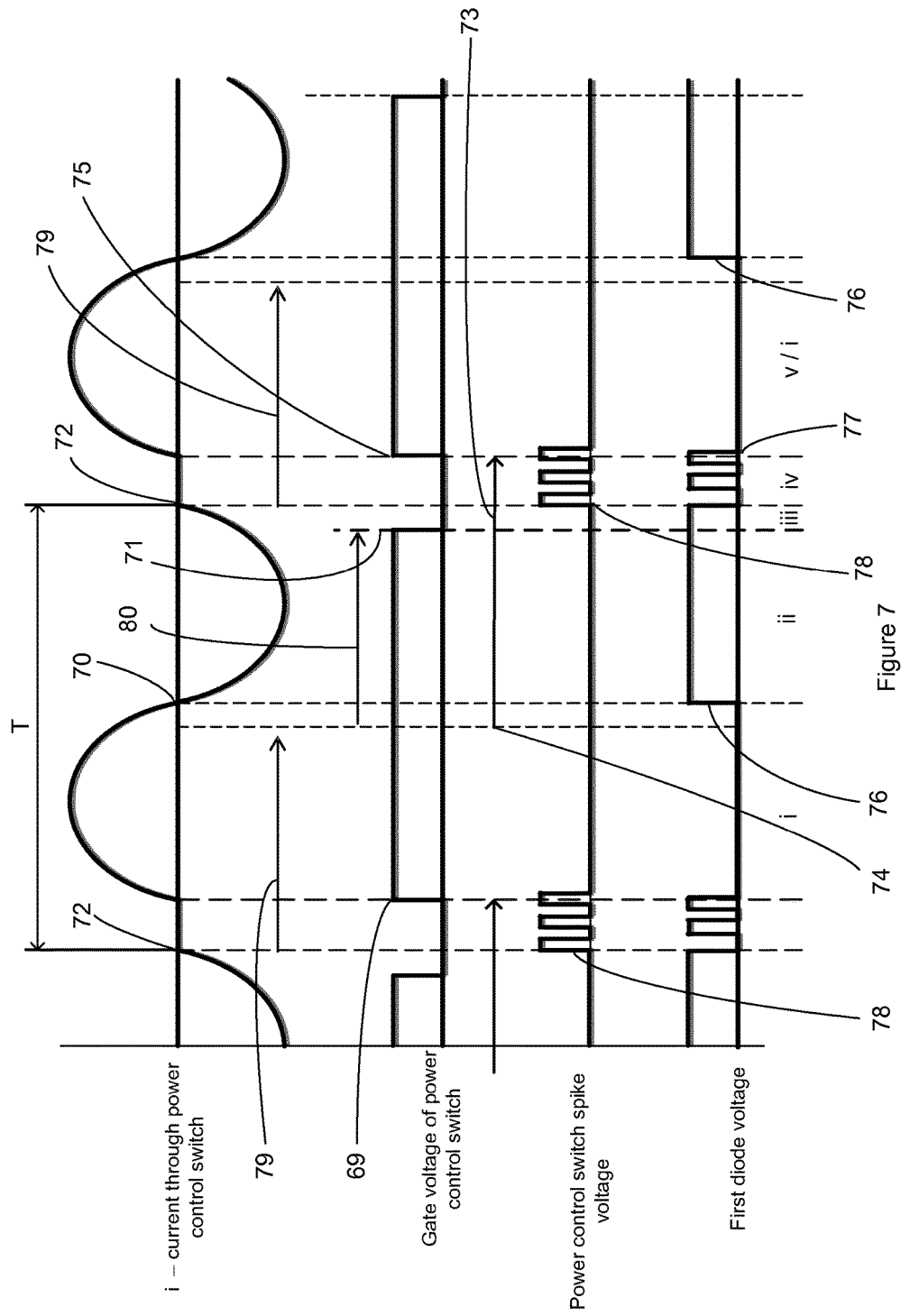
FIG. 7 shows waveforms corresponding to the operation of the receiver of FIG. 2 according to one embodiment.
Figure 8B:
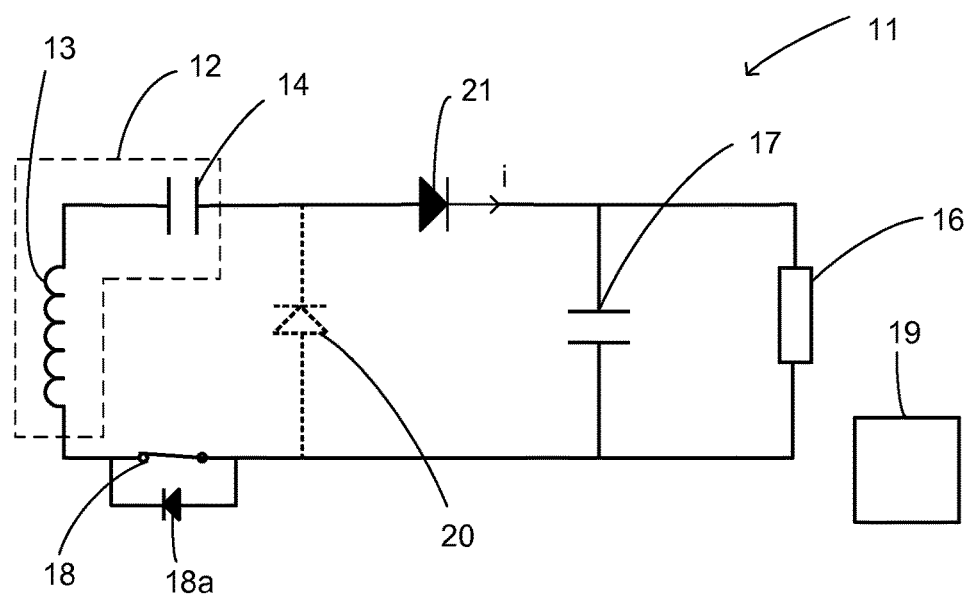
FIGS. 8A to 8D show effective circuit diagrams corresponding to the different stages of operation of the receiver of FIG. 2 according to one embodiment.
Figure 8A:
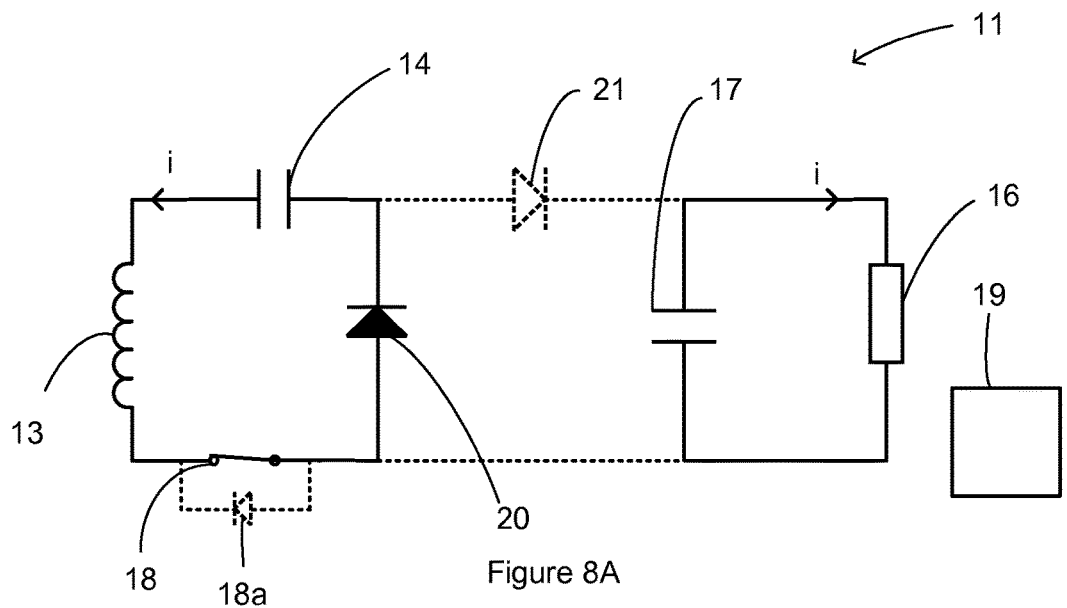
Figure 8C:
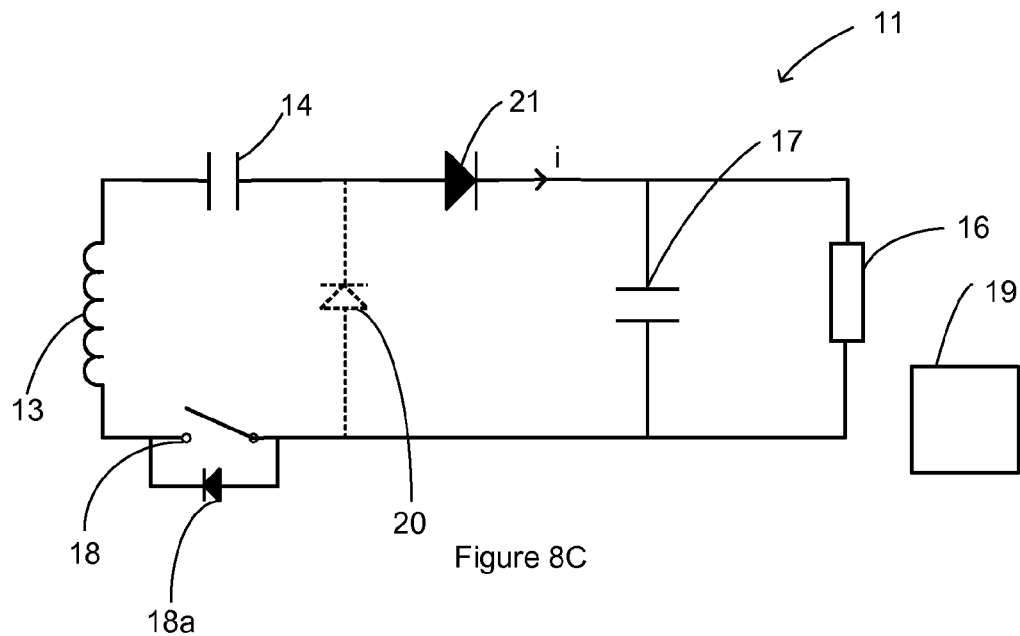
Figure 8D:
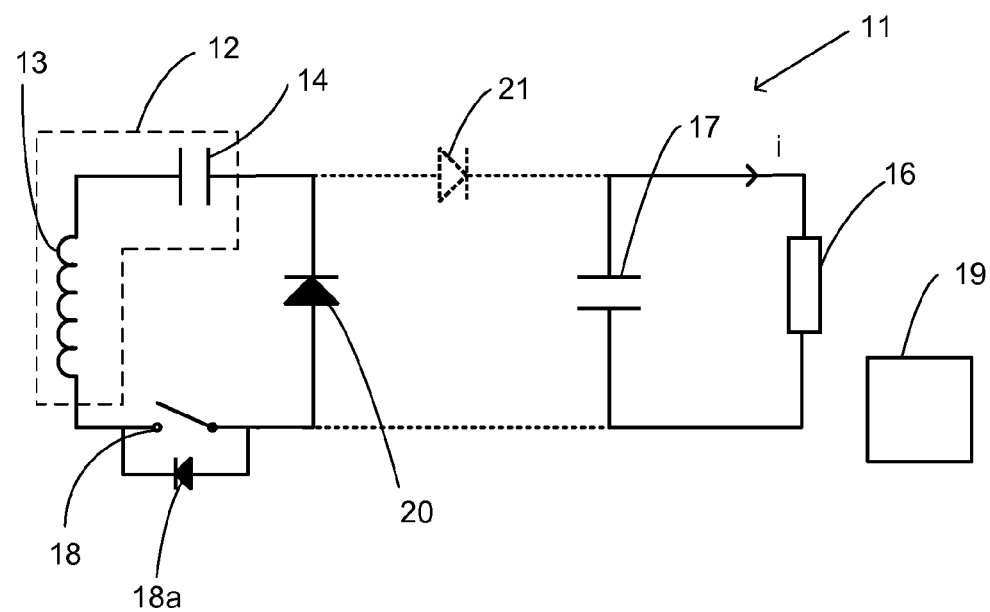

Referring to FIG. 7 (and associated FIGS. 8A-8D), there is shown waveforms for the receiver 11 as shown in FIG. 2. This shows how the power control switch 18 may be controlled so as to regulate the power provided to the load 16. It will be appreciated that this is not the only possible method for regulating the power provided to the load. Further those skilled in the art will appreciate how this method may be adapted for other receiver embodiments of the present invention. The steps are:

i. The power control switch 18 is turned on 69. This allows current to flow in the forward direction through the power control switch, so that current is provided to the resonant capacitor 14. The DC smoothing capacitor 17 provides power to the load 16. This is shown in the effective circuit in FIG. 8A.

ii. When the current through the power control switch 18 goes from positive to negative 70, the power control switch is kept on and power from the resonant circuit 12 is provided to the DC smoothing capacitor 17 and the load 16. This is shown in the effective circuit in FIG. 8B iii. Before the current reaches zero the power control switch 18 is turned off 71. The power control switch can be turned off at any point when the current through the power control switch is negative. Due to the body diode 18a in the power control switch, power continues to flow to the DC smoothing capacitor 17 and the load 16. Preferably, the power control switch is kept on until just before the current though the power control switch reaches zero 72 as this minimises the losses through the body diode. Since the resonant period of the resonant circuit is known, it can be estimated when the current will reach zero. As will be discussed in more detail below this requires detecting the phase of the current. This is shown in the effective circuit in FIG. 8C.

iv. When the current through the power control switch 18 reaches zero 72, the power control switch is still off, and now the body diode 18a transitions from forward to reverse bias and will block the flow of current, leaving the resonant circuit 12 open circuited. The DC smoothing capacitor 17 provides power to the load 16. The power control switch is kept off until the end of a power control time interval 73. This power control time interval is varied according to the power requirements of the load. Essentially, the power control time interval establishes a phase delay between the voltage induced in the receiver coil and the current that flows through the receiver coil, which allows the power provided to the load to be controlled. As will be discussed in more detail below, this power control time interval may be measured from a reference point 74 that precedes the current through the power control switch going from negative to zero 72. This is shown in the effective circuit in FIG. 8D.

v. After the power control time interval 73, the power control switch is turned back on 75, and the current begins to flow so that power is provided to the resonant capacitor 14. This is shown in the effective circuit in FIG. 8A.

This method is reliant on detecting the phase of the current so that the points when the current through the switch reaches zero 70 72 can be determined. According to one embodiment of this invention, the method detects the phase by sensing the occurrence of two operational transitions that may be used as indicators of the phase, and using one of these transitions to indicate a reference phase. In particular, the method senses two transitions that have differing reliability under different load conditions, and uses one as the indicator of the phase of the current.

In one embodiment, the first operational transition is the change in polarity 76 of the voltage across the first diode 20 in the voltage multiplier circuit 15. When current flows from the resonant circuit 12 through to the load 16, the voltage across the first diode will be clamped at the output voltage. In a preferred embodiment this may be +5V. Conversely, when the current flows in the opposite direction through the resonant circuit, the first diode will be forward biased and so the voltage across the first diode will be near zero volts. Thus the change in magnitude of the voltage across the first diode in the voltage multiplier circuit can be used to indicate the phase of the current in the power control switch 18. In the embodiment shown in the waveforms of FIG. 7, the rising edge of the first diode voltage 76 produces a more reliable signal than the falling edge 77. It may be possible for this rising edge to be detected by a microcontroller such as Programmable System-On-Chip or any other suitable means. In this embodiment, the rising edge corresponds to the current through the power flow control switch going from positive to negative 70. Such a change in diode voltage polarity will typically produce a more reliable signal when the receiver is under a high load. Under a low load, the change in voltage polarity may have excessive noise. The voltage across the first diode is a function of the current flowing through the resonant circuit and at light load; this current may be very low, non-sinusoidal and dominated by non-ideal device properties, without a clear positive and negative cycle.

In the same embodiment, the second operational transition is the voltage spike 78 in the power control switch that occurs when the current across the power control switch 18 reaches zero. This spike 78 is shown in the waveforms in FIG. 7. Those skilled in the art will appreciate that such voltage spikes are a known phenomenon resulting from the intrinsic capacitance of switches interacting with a series inductance as the current through that series inductances crosses from negative to positive. Typically, this is a problem that needs to be minimised. However, in this case the voltage spike is used advantageously to indicate the zero crossing 72 of the current through the power control switch. According to one implementation once the voltage spike is sensed 78 the signal may be delayed for half a period 79 such that it will approximately coincide with the current going from positive to negative 74 70. Such a voltage spike will typically produce a more reliable signal when the receiver is under a low load or medium load. Under a high load, the voltage spike may not be distinguishable, because when fully loaded, the power control switch may never be turned off so as to increase power output, in which case there is no voltage spike across the switch. Alternatively, the power control switch may be turned off for such a short time (i.e. the power control time interval is short), that the voltage spike cannot be processed by the controller.

Those skilled in the art will appreciate that the delay 79 is necessary so that the first operational transition and the second operational transition, which are related to different parts of the waveform, can be compared. It will also be appreciated that though the delay in the embodiment described above was applied to the second operational transition for half a period, it is consistent with the invention for a delay to be applied to either operational transition (if at all) for any suitable duration.

In one embodiment, the phase reference is then determined based on which of the operational transitions are detected first, either the first operational transition 76 or the second operational transition (after it has been delayed by half a period) 74, within a detection window. Thus, under a high load it is possible that the second operational transition will not be sensed, and therefore the phase will be determined based solely on the occurrence of the first operational transition. Equivalently, under a low load it is possible that the first operational transition will not be sensed, and therefore the phase will be determined based solely on the occurrence of the second operational transition. Under a medium load, either operational transition may be used (depending on which is detected first in the detection window). It will be appreciated how such an approach is beneficial in that it provides the benefits of phase detection methods for either high or low loads, and will naturally adjust as the load changes from high to low, or vice versa, without undue complexity. Referring to the waveforms in FIG. 7, this phase reference 74 is used as a reference point from which the power control time interval 73 is measured. Again, those skilled in the art will appreciate that this reference point may be suitably established at any point in the cycle, with the power control time interval adjusting accordingly, and the invention is not limited in this respect. This phase reference 74 may also be used as a reference point from which the time when the power control switch is turned off 71. In this embodiment, the power control switch is turned off less than half a period 80 after the reference point.

Figure 9:
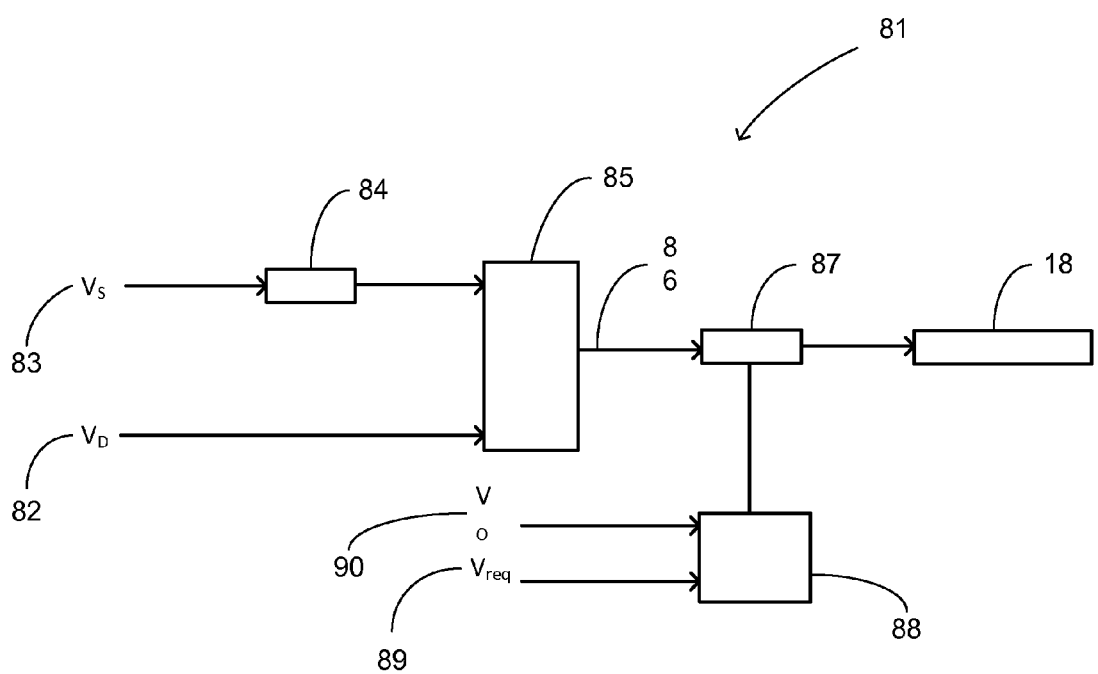
FIG. 9 shows a circuit diagram for an embodiment of a controller for the receiver of FIG. 2.

Referring to FIG. 9, there is shown a block diagram 81 of the control circuit that may be used to implement the control method described above. Those skilled in the art will appreciate that there are any number of possible methods for implementing the control method described above, and the invention is not limited in this respect. The circuit receives inputs from the voltage across the first diode 82 (according to the sensing of the first operational transition described above) and the voltage spike across the power control switch 83 (according to the sensing of the second operational transition described above). The voltage spike across the power control switch is delayed 84 by half a period. These are input into a windowed trigger 85. The first input detected is used to indicate the phase of the current. This produces a signal 86 that is delayed by a power control time interval in a power control delay 87, before switching on the power control switch 18. The length of the power control time interval may be controlled by a proportional-integral controller (PI) circuit 88. The PI circuit may receive inputs including the power requirements of the load 89 and the power being provided to the load 90.

Figure 10:
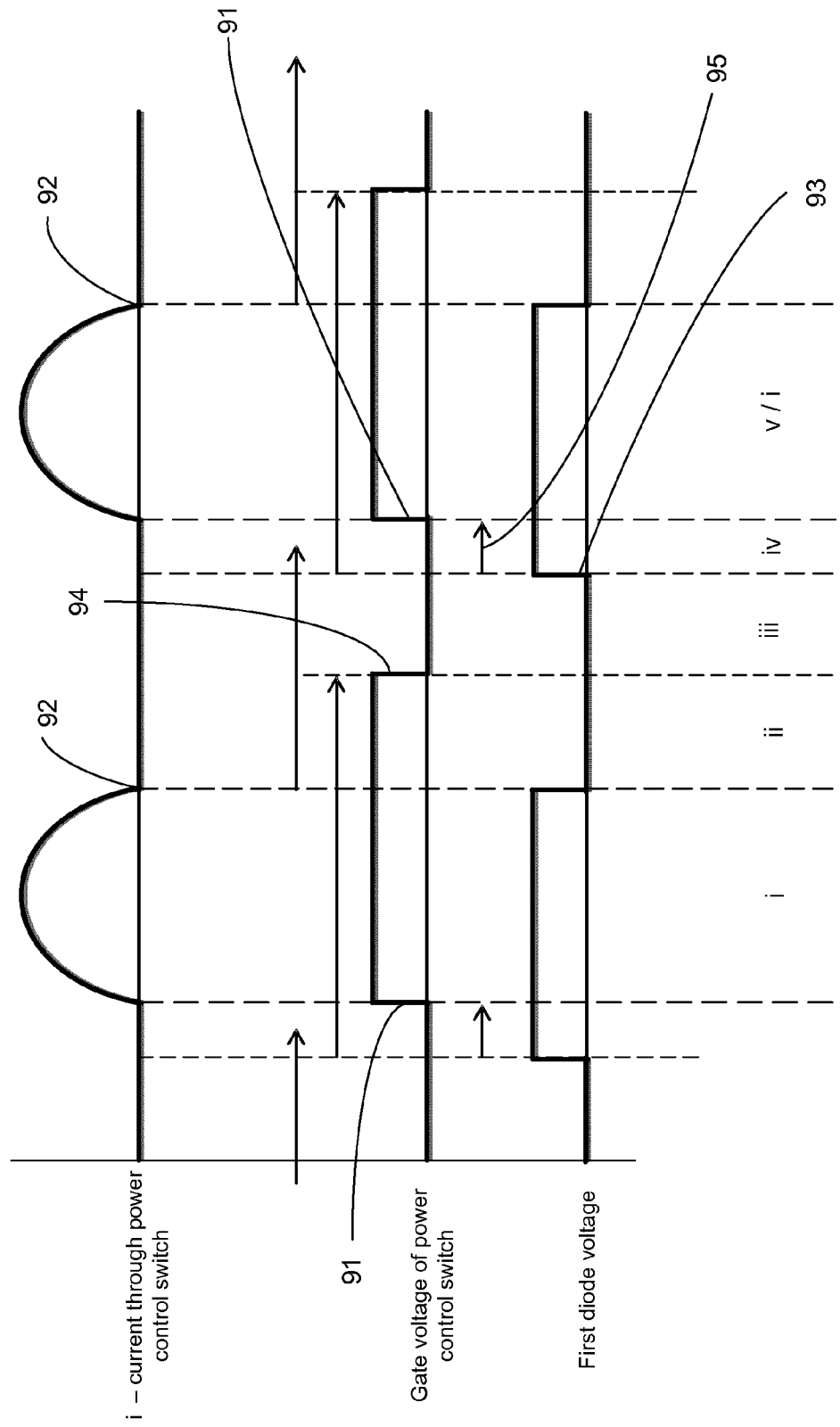
FIG. 10 shows waveforms corresponding to the operation of the receiver of FIG. 4 according to one embodiment.
Figure 11C:
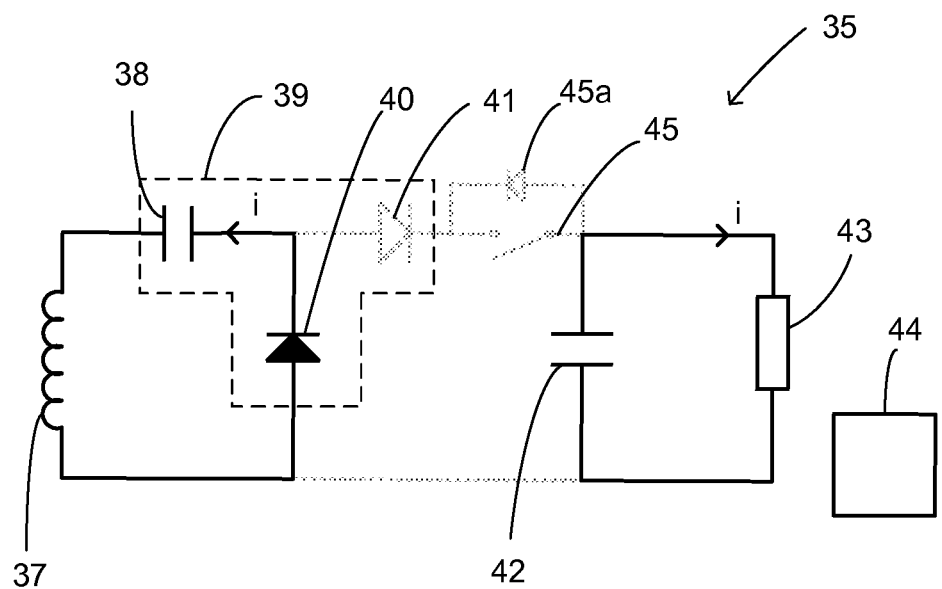
Figure 11D:
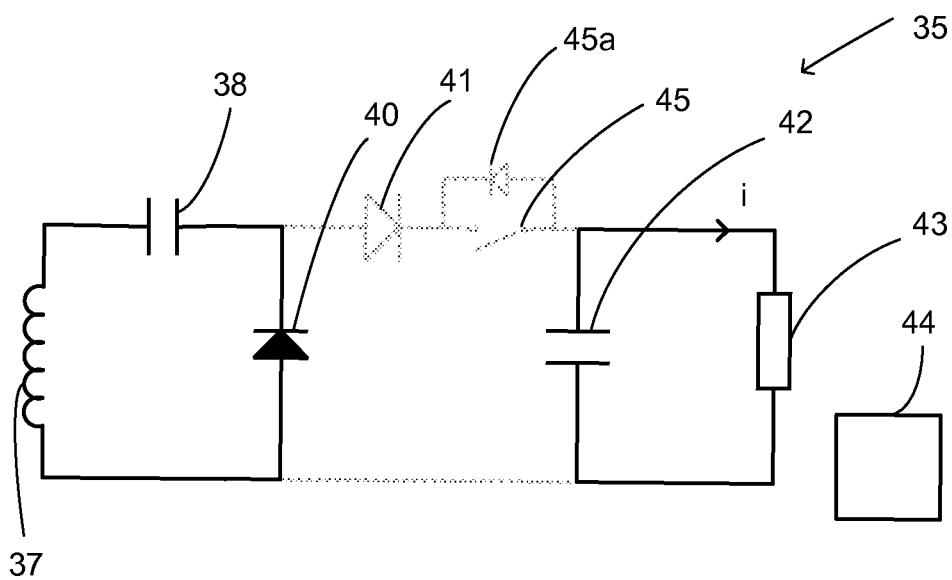

Referring to FIG. 10, there is shown waveforms for the receiver 35 as shown in FIG. 4. This shows how the power control switching method described in reference to FIGS. 7 and 8A-8D may be modified for a different receiver topology. The steps are:
i. The power control switch 45 is turned on 91. This allows current to flow in the forward direction through the power control switch, so that current is provided to the DC smoothing capacitor 42 and the load 43. This is shown in the effective circuit in FIG. 11A.
ii. When the current through the power control switch 45 reaches zero 92, the power control switch is kept on and current is provided to the resonant circuit 36. The DC smoothing capacitor 42 provides power to the load 43. This is shown in the effective circuit in FIG. 11B
iii. Before the voltage across the first diode 40 in the voltage multiplier circuit 39 changes polarity 93 the power control switch is turned off 94. The switch can be turned off at any point when the current through the power control switch is not positive. This is shown in the effective circuit in FIG. 11C.
iv. When the voltage across the first diode 40 changes polarity 93, the power control switch 45 is still off, and now the body diode 45a transitions from forward to reverse bias and will block the flow of current. The DC smoothing capacitor 42 provides power to the load 43. The power control switch is kept off until the end of a power control time interval 95. This power control time interval is varied according to the power requirements of the load. Essentially, the power control time interval establishes the impedance of the circuit which allows the power provided to the load to be controlled. This is shown in the effective circuit in FIG. 11D.
v. After the power control time interval 95, the power control switch 45 is turned back on 91, and the current begins to flow so that power is provided to the DC smoothing capacitor 42 and the load 43. This is shown in the effective circuit in FIG. 11A.

In another possible embodiment of the present invention, the power control switch of the receiver 35 shown in FIG. 4 is controlled so as to regulate the power provided to the load according to the following:
i. If the voltage supplied to the load 43 is less than the load's required voltage, then the power control switch 45 is turned on so that power from the resonant circuit 36 and voltage multiplier circuit 39 is provided to the load (see the effective circuits in FIGS. 11A and 11B for when the current through the power control switch is greater than zero and less than zero respectively);
ii. If the voltage supplied to the load is more than the load's required voltage, then the power control switch is turned off. This prevents power from being provided to the load. Also, once the resonant capacitor in the resonant circuit is fully charged, current will no longer flow in the resonant circuit.

This method may be considered to operate in an analogous manner to a bang bang controller with zero hysteresis. It may also be possible to modify the method to operate in an analogous manner to a bang bang controller with a degree of hysteresis.

The power control switch may be controlled to switch on or off when the current is zero (i.e. zero-current switching). This may be implemented by detecting the current phase in the resonant circuit using a current sense resistor, a current transformer or some other means. This information may be provided to a controller that controls the power control switch.

Again, it will be appreciated that this is not the only possible method for regulating the power provided to the load. Further those skilled in the art will appreciate how this method may be adapted for other receiver embodiments of the present invention.

In another aspect of the invention, it may be possible to adapt the controller to override the normal control of the power control switch(es) in the case of a specified condition occurring. In one embodiment, the specified condition may be the voltage being provided to the load exceeding or falling below predetermined thresholds. The controller may be adapted to detect the voltage exceeding or falling below the predetermined threshold, and override the normal control of the power control switch by turning the power control switch off or on (which ever would cause the voltage to change as required) until the voltage returns to a suitable operating range.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transfer receiver including:
   a resonant circuit, having a receiving coil connected in series with a capacitor;
   a rectifier comprising two asymmetric current flow devices in a half-bridge configuration for providing a DC output voltage to a load;
   a power control switch for regulating the power supplied to the load; and
   a controller that controls the power control switch to regulate the power supplied to the load based on detecting a zero crossing of a voltage across one of the asymmetric current flow devices of the rectifier,
   wherein the power control switch is connected in series with the resonant circuit.

2. The inductive power transfer receiver in claim 1 wherein the controller further controls the power control switch to regulate the power supplied to the load based on a voltage spike in a voltage across the power control switch.

3. The inductive coupled power transfer receiver of claim 1, wherein the power control switch is connected in series with the load.

4. The inductive coupled power transfer receiver of claim 1, wherein the power control switch is connected in series with the asymmetric current flow devices.

5. The inductive power transfer receiver of claim 1, wherein the asymmetric current flow devices are diodes.

6. The inductive power transfer receiver of claim 1, wherein the asymmetric current flow devices are switches.

7. The inductive power transfer receiver of claim 1, wherein the asymmetric current flow devices are a combination of diodes and switches.

8. The inductive coupled power transfer receiver of claim 1, wherein the controller controls the power control switch in switch mode.

9. The inductive coupled power transfer receiver of claim 1, including a further power control switch for regulating the power supplied to the load.

10. The inductive coupled power transfer receiver of claim 9, wherein the further power control switch is connected in series with the resonant circuit.

11. The inductive coupled power transfer receiver of claim 9, wherein the further power control switch is connected in series with the load.

12. The inductive coupled power transfer receiver of claim 9, wherein the further power control switch is connected in series with an asymmetric current flow device of the rectifier.

13. The inductive coupled power transfer receiver of claim 1, wherein the power control switch is connected in series with the load.

14. The inductive power transfer receiver of claim 1, wherein the rectifier has a shared AC and DC ground.

15. An inductive power transfer receiver including:
    a resonant circuit, having a receiving coil connected in series with a capacitor;
    a rectifier comprising two asymmetric current flow devices in a half-bridge configuration for providing a DC output voltage to a load;
    a power control switch for regulating the power supplied to the load; and
    a controller that receives an input representative of a voltage across the power control switch, detects a voltage spike across the power control switch, and controls the power control switch to regulate the power supplied to the load based on the detected voltage spike,
    wherein the power control switch is connected in series with the resonant circuit.

16. The inductive power transfer receiver in claim 15 wherein the controller further controls the power control switch to regulate the power supplied to the load based on detecting a zero crossing of a voltage across one of the asymmetric current flow devices of the rectifier.

17. The inductive coupled power transfer receiver of claim 15, wherein the power control switch is connected in series with the asymmetric current flow devices.

18. The inductive coupled power transfer receiver of claim 15, wherein the controller controls the power control switch in switch mode.

19. The inductive power transfer receiver of claim 15, including a further power control switch for regulating the power supplied to the load.

20. The inductive power transfer receiver of claim 15, wherein the rectifier has a shared AC and DC ground.

21. An inductive power transfer receiver including:
    a resonant circuit, having a receiving coil connected in series with a capacitor;
    a first asymmetric current flow device connected in series with the resonant circuit and for providing a DC output voltage to a load;
    a second asymmetric current flow device connected in parallel with the resonant circuit;
    a power control switch for regulating power supplied to the load; and
    a controller that controls the power control switch to regulate the power supplied to the load based on a detected voltage spike across the power control switch or based on a detected zero-crossing of a voltage across one of the first and second asymmetric current flow devices, wherein the power control switch is connected in series with the resonant circuit.

22. The inductive power transfer receiver of claim 21, including a shared AC and DC ground.

* * * * *